3,558,574
ACRYLATED ADHESIVE PRODUCTS
Donald F. Doehnert, Millington, N.J., assignor to Johnson & Johnson, a corporation of New Jersey
Filed Dec. 9, 1968, Ser. No. 782,153
Int. Cl. C08f 15/40, 37/00, 47/12
U.S. Cl. 260—78.5         21 Claims

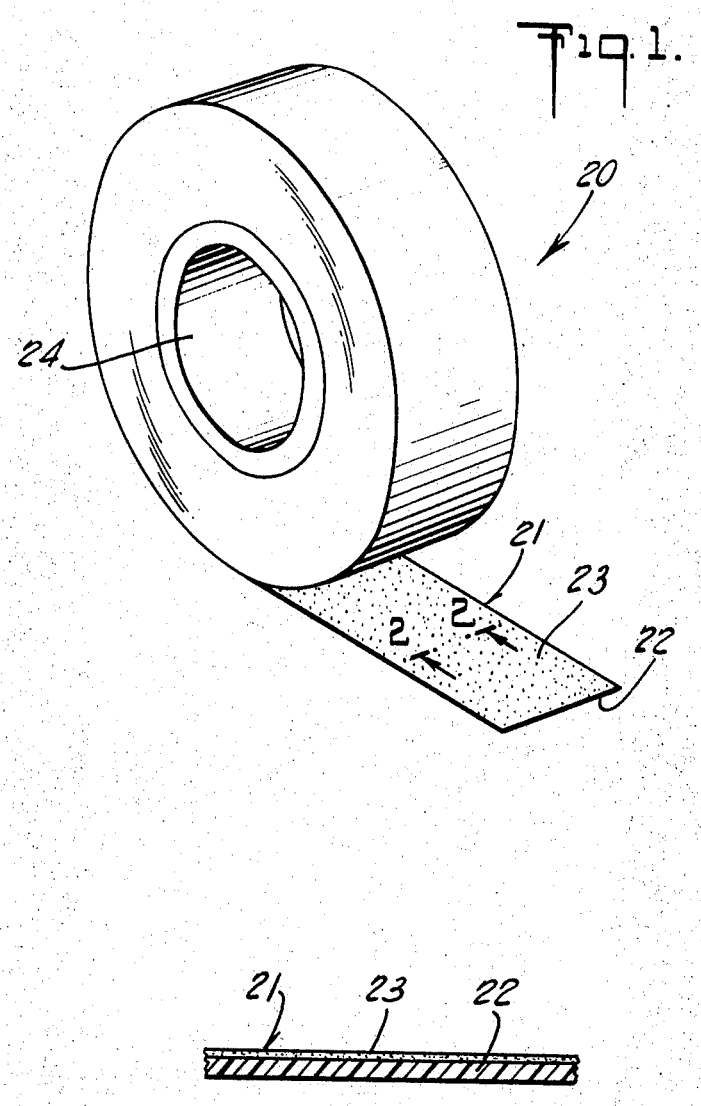

ABSTRACT OF THE DISCLOSURE

Acrylate pressure-sensitive adhesive products based on an adhesive copolymer of monomers comprising a major amount of a medium chain length alkyl acrylate monomer, preferably a minor amount of a cohesion inducing short chain monomer, a minor amount of a substituted acrylamide, about 0.5–5.0 parts by weight of the total monomer solids, preferably about 1–3 parts of the total monomers, of maleic enhydride, and a very small amount of a polymerizable cross-linking monomer. The monomers are copolymerized in a suitable organic solvent to form a stable adhesive copolymer solution. A suitable cross-linking catalyst, such as an organo-metalic salt catalyst, then added to the adhesive solution just prior to coating on the desired backing sheet and the copolymer is cross-linked in situ as the sheet is processed.

---

The present invention relates to pressure-sensitive adhesive sheets and tapes and pressure-sensitive adhesives therefor and more particularly to pressure-sensitive acrylate adhesive products.

Pressure-sensitive adhesives based upon acrylate copolymers are well known for their many fine qualities, principally for their ability to provide the desired tack without the addition of a tackifying resin and for their outstanding clarity. However, these adhesives are sensitive to heat and solvents and are adversely affected thereby. Various proposals have been made for cross-linking acrylate adhesives to increase their resistance to heat and solvents. However, these usually have resulted in adhesives which are difficult if not impossible to coat except at low solids and products which lack the other properties, such as tack, which are necessary in a pressure-sensitive adhesive.

I have invented a novel cross-linked acrylate pressure-sensitive product which possesses excelelnt resistance to solvents and to shear at normal and elevated temperatures as well as the desired balance of tack, hold, cohesive strength and other properties which are so difficult to obtain in cross-linked copolymers of this type. My adhesive is formulated from a predominantly medium chain length acrylate backbone which preferably includes a cohesion or hardness inducing short chain acrylate monomer, together with a synergistic combination of maleic anhydride and a particular type of a substituted acrylamide; all of which are copolymerized with one another and with a small amount of a polymerizable cross-linking monomer, and then cross-linked in situ upon the addition of a suitable cross-linking catalyst. I have discovered that the desired performance characteristics of the adhesive products of this invention are closely related to the plasticity of the adhesive. Thus, I have determined that the dried and cross-linked adhesive according to this invention should have a Williams plasticity of about 1.8–3.0 for best results, although adhesive having somewhat higher and lower plasticities also may be used to contribute the desired balance of physical properties to the resulting adhesive product.

The pressure-sensitive adhesive product of this invention is based upon an adhesive copolymer which comprises a major amount of a relatively soft medium chain length alkyl acrylate monomer and preferably a minor amount of of a cohesion and hardness inducing short chain monomer; a minor amount of a particular type of substituted acrylamide; about 0.5–5.0 parts by weight of the monomer solids, preferably about 1–3 parts; of maleic anhydride; and a very small amount of a suitable cross-linking monomer copolymerizable with the other monomers. These monomers are mixed and copolymerized in a suitable organic solvent to form a stable adhesive copolymer solution having a relatively high solids content and an excellent "pot life," as will be described more fully hereinafter. Just prior to coating on a backing sheet to form a pressure-sensitive adhesive product of this invention, a very small amount of a suitable cross-linking catalyst is added to the copolymer solution. After coating, the copolymer is cross-linked in situ as the coated sheet is processed.

The relatively soft medium chain length alkyl acrylate monomers of this invention generally are those averaging about 4–12 carbon atoms in the alcohol moiety and include butyl, hexyl, 2 ethylhexyl, octyl, decyl, and dodecyl acrylates, and the like, alone or copolymerized with one another or with higher and lower alkyl acrylates. This soft acrylate monomer is present in the adhesive copolymer of this invention in a major amount by weight of the copolymer. When the term "parts" is used above and hereinafter in this application, it shall mean parts per 100 parts by weight of the total monomer solids from which the adhesive copolymer is polymerized, unless otherwise indicated.

The cohesion inducing short chain monomers of this invention generally are selected from vinyl acetate, methyl acrylate, methyl methacrylate, and the like, and normally are present in the adhesive copolymer in the amount of about 5–30 parts, preferably above about 10 parts.

The substituted acrylamide of this invention conforms to the following general formula:

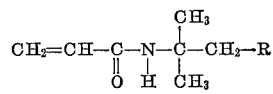

where R is either H or

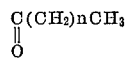

wherein n is a number of 0 through 10.

Diacetone acrylamide, i.e.,

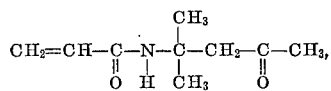

is preferred. However, other acrylamides such as N-tertiarybutyl acrylamide may be used. The acrylamide is present in the copolymer in the amount of about 2–20 parts by weight of the copolymer, preferably about 2–7 parts.

The polymerizable cross-linking monomer of this invention preferably is an alkoxy silyl cross-linking monomer which may be prepared as described in United States patent application Ser. No. 399,837, filed Sept. 28, 1964, and comprises an alkoxy silyl alkyl group and an unsaturated functional terminal group copolymerizable with the other monomers. This functional terminal group preferably is an acrylate or substituted acrylate group such as

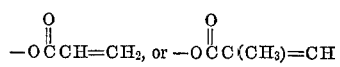

The polymerizable cross-linking alkoxy silyl alkyl groups found to be particularly effective are those having the general formula

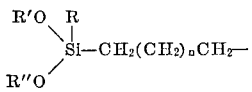

where R' and R'' are either CH₃— or CH₃CH₂— and R is one of the group consisting of CH₃—, CH₃CH₂, CH₃CH₂O—, and $n$ is a number of 0 through 8. A preferred silyl cros-linking monomer is 3 - methacryloxypropyltrimethoxy-silane, i.e.,

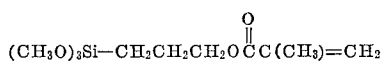

The amount of the silyl cross-linking monomer to be included in preparing the copolymer depends on the exact constituents of the copolymer and the degree of cross-linking desired. Very small amounts are found to be effective. The silyl cross-linking monomer will generally be included in amounts of about 0.005 to 0.4 parts by weight of the copolymer with about 0.01 part being preferred.

The adhesive copolymer composition of this invention preferably is produced by mixing the monomers in the desired proportions to form a monomer mix and then polymerizing the mixture in a suitable organic solvent, such as ethyl acetate, isopropyl acetate, acetone, cyclohexane, tertiary-butyl alcohol, or the like, alone or mixed with one another, utilizing a suitable catalyst, such as benzoyl peroxide, for the polymerization reaction. Preferably, polymerization takes place in more than one stage as will be seen from the examples. As mentioned hereinbefore, with the adhesive copolymer of this invention the solids content can be maintained relatively high, preferably at about 40 percent and above, while maintaining the adhesive fully coatable for an extended period of time. This is a very important factor in achieving maximum cost savings in the production of a superior pressure-sensitive adhesive product.

The cross-linking catalyst preferably is of the organometallic salt type such as the organo-metallic salts of lead or tin illustrated by lead octoate, dibutyltin bis 2-ethylhexoate, dibutyltin laureate, etc. However, strong acid catalyst such as paratoluene sulfonic acid and others, also may be used for this purpose. The catalyst is added to the adhesive solution in the amount of about 0.005–1.0 parts by weight of the adhesive copolymer. After the catalyst is added, cross-linking may be effected very quickly, say in about 5 minutes, by passing the adhesive product through an air circulating oven at about 200–210° F. A small amount of alcohol may be added to stabilize the viscosity of catalyzed solutions for about one, two or more weeks. However, the alcohol does not inhibit the cross-linking reaction after the adhesive is dried. The resulting product possesses excellent adhesive properties and good resistance to heat and solvents. The adhesive, itself, remains clear, or water white.

Other and further advantages of this invention will appear to one skilled in the art from the following description and claims, wherein:

FIG. 1 is a view in perspective of a roll of tape according to one embodiment of the invention, and FIG. 2 is a greatly enlarged fragmental sectional view taken along the line 2—2 of FIG. 1.

Referring to the drawings, there is shown a roll 20 of pressure-sensitive adhesive tape 21, according to one embodiment of this invention, which comprises a flexible backing sheet 22 and a layer 23 of pressure-sensitive adhesive composition according to this invention coated on one major surface of said blocking. The tape 21 normally is wound upon itself around a core 24 with the adhesive side of the tape facing inwardly toward the core. The backing sheet 22 may be a plastic film, paper, or any other suitable backing material and the tape may include various other layers or coatings, such as primers, release coatings, and the like, which are used in the manufacture of pressure-sensitive adhesive tapes.

The following examples are given only by way of illustration and are not intended to limit the scope of the present invention in any way. In the examples all proportions are given in parts per one hundred parts by weight of the total adhesive monomer solids unless otherwise indicated.

EXAMPLE I

A three-liter, three-necked flask is set up with a water condenser, a mechanical stirrer, a thermometer, and a gas inlet tube. The flask is placed in a water bath which is heated electrically. To the flask is added 65 parts of 2-ethylhexylacrylate, 28 parts of methyl acrylate, 5 parts of diacetone acrylamide, 2 parts of maleic anhydride, 0.05 part of 3-methacryloxypropyltrimethoxysilane, 50 parts of acetone, 50 parts of ethyl acetate, and 0.3 part of benzoyl peroxide. The reaction mixture is heated to a temperature of 75° C. while the air in the flask is displaced with a slow stream of nitrogen. The nitrogen flushing is then discontinued and a vigorous exothermic polymerization ensues which lasts for about one-half hour. Stirring and heating at 65–70° C. is continued for one hour. Then, 0.5 part of benzoyl peroxide dissolved in 36 parts of ethyl acetate is slowly added over three hours to reduce the reaction viscosity and to obtain more complete polymerization. After four additional hours of continuous gentle reflux, the reaction is then discontinued, 14 parts of isopropyl alcohol is added, and the solution polymer is cooled. The solids content of the copolymer solution is found to be 39%, solution viscosity, 4000 cps., and Williams plasticity, 1.7 mm.

The solution adhesive is then made more readily cross-linkable by the addition of 0.8 part of dibutyltin bis 2-ethylhexoate catalyst as 50 percent solids in toluene. The adhesive is coated onto a 1.5 mil film of polyethylene terephthalate and cured for five minutes in an air circulating oven at 210° F. to give a mass deposit of about 1.0 oz. per square yard. The coated film is then slit into tapes and wound upon itself in the form of rolls. The adhesive polymer is clear and colorless and the adhesive has excellent pressure-sensitive adhesive characteristics. It has excellent finger tack i.e., a quick stick of 2, good solvent resistance, adhesion to steel of 35 oz. per in. of width, a 20° hold to chrome of 150 minutes, a Williams plasticity of 2.3 mm., as well as improved shear resistance both at room and elevated temperatures.

In the following examples the adhesive formulations indictaed are copolymerized and made into tapes as in Example I and then tested, with the following results.

|  | Example— | | |
| --- | --- | --- | --- |
|  | II | III | IV |
| 2-ethylhexyl acrylate, parts | 65 | 65 | 65 |
| Vinyl acetate, parts |  |  | 18 |
| Methyl acrylate, parts | 28 | 27 |  |
| N-tertbutylacrylamide, parts | 5 |  |  |
| Diacetone acrylamide, parts |  | 5 | 5 |
| Maleic anhydride, parts | 2 | 3 | 2 |
| 3-methacryloxypropyltrimethoxysilane, parts | 0.05 | 0.05 | 0.05 |
| Approximate percent solids content (before coating) | 39 | 39 | 39 |
| Williams plasticicty (after crosslinking) | 2.8 | 2.0 | 2.2 |
| Adhesion, oz-/in. width | 37 | 45 | 30 |
| Quick stick | 0.5 | 0.8 | 2.0 |
| 20° hold to chrome ,mins. (75° F.) | 140 | 200 | 350 |

All of the above adhesives are clear and colorless, and the resulting pressure-sensitive adhesive tapes possess excellent resistance to solvents and perform well at elevated temperatures.

In the following additional Examples the adhesive formulations indicated are copolymerized and made into tapes as in Example I, using the specified polymerization solvents and solids, and then tested to give the following results.

|  | Example— | | | |
|---|---|---|---|---|
|  | V | VI | VII | VIII |
| 2-ethylhexyl acrylate, parts | 75 | 75 | 75 | 75 |
| Vinyl acetate, parts | 16 | 19 | 13.5 | 21 |
| Methyl acrylate, parts |  |  |  |  |
| N-tert-butylacrylamide, parts | 7 |  |  |  |
| Diacetone acrylamide, parts |  | 5 | 10 | 2 |
| Maleic anhydride, parts | 2 | 1 | 1.5 | 2 |
| 3-methacryloxypropyltrimethoxysilane, parts | 0.02 | 0.04 | 0.05 | 0.05 |
| Polymerization solvents and proportions* | 28A, 72EA | 30A, 70EA | 28A, 72EA | 37A, 63EA |
| Approximate percent solids content at end of polymerization | 49 | 47 | 43 | 45 |
| Williams plasticity (after crosslinking) | 1.93 | 3.05 | 1.98 | 2.74 |
| Adhesion, oz/in. width | 45 | 25 | 35 | 25 |
| Quick stick | 1 | 6 | 2 | 2.2 |
| Hold to chrome, mins. (75° F.) | 120 | 150 | 65 | 185 |

Again, the above adhesives are clear and colorless, and the resulting pressure-sensitive adhesive tapes possess excellent resistance to solvents as well as improved shear resistance and the capability of performing well at elevated temperatures.

The properties of the adhesive products of this invention are determined in the foregoing examples by the following tests.

Adhesive strength or peel adhesion to steel is measured by peeling the tape backing over itself 180° at a constant speed (by a force applied to the free end of the tape) from a smooth steel surface to which it has been applied by a fixed pressure. For the techniques used in conducting this test, see 180° peel adhesion test PSTC-1 of the Pressure-Sensitive Tape Council.

Quick stick is measured by laying a length of tape, adhesive side up, upon a horizontal surface and then rolling a hollow plastic ball down an incline onto the adhesive. The vertical height at which the ball starts and the distance the ball rolls along the tape before coming to rest is measured. Quick stick is reported as the height in inches raised to the three-halves power, divided by the distance rolled in inches. This ratio is found to be a constant for a given tape. The ball is plastic and approximately 1.5 inches in diameter, and weighs approximately 2 grams. Its outer surface is carefully cleaned between each test.

Hold to chrome is measured in terms of the time taken to strip a specified tape sample from a one-half (½) inch by one-half (½) inch chrome-plate surface by attaching a 400 gram weight to the bottom end of the tape when the surface is disposed at 20° to the vertical and the tape is hanging at an angle of 20° to the adjacent portion of the chrome-plated surface from which it is being removed.

Williams plasticity is determined as follows. A wet film of the solution adhesive is coated on silicone release paper so as to produce a dry film approximately 1½ mils in thickness. It is dried five minutes at 195–200° F. in a circulating air oven. The adhesive is removed from the silicone paper and a pellet exactly 2 grams in weight is formed in the shape of a ball. The sample ball is placed between two plasticity papers and conditioned for 15 minutes at 100° F. The plasticity papers consist of papers with a highly clossy clay coated surface facing the plasticity pellet. The Williams plasticity is the thickness of the pellet in mm. after 15 minutes compression at 100° F. in the plastometer under a 5 kg. load.

The desired balance of pressure-sensitive adhesive properties according to this invention is best achieved with a peel adhesion of at least about 25 ounces per inch of width, a quick stick of at least about 0.4 or 0.5, preferably above 1, and a hold to chrome of at least about 1 hour.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A normally tacky and pressure-sensitive sheet which comprises a thin flexible backing member and a pressure-sensitive adhesive composition coated on one major surface thereof; said composition comprising a copolymer of monomers comprising
   (a) a major amount of an alkyl acrylate monomer constituent wherein the alcohol moiety comprises an average of no more than about 12 carbon atoms,
   (b) about 2–20 parts by weight of the total monomer solids of a substituted acrylamide according to the following general formula:

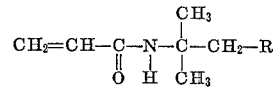

where R is either H or

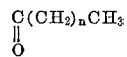

wherein $n$ is a number of 0 through 10,
   (c) about 0.5–5.0 parts by weight of the total monomer solids of maleic anhydride, and
   (a) about 0.005–0.4 parts by weight of the total monomer solids of a cross-linking monomer having an unsaturated functional terminal group which is copolymerizable with the other monomers;
and a small amount of a suitable catalyst for cross-linking said copolymer.

2. A pressure-sensitive adhesive sheet according to claim 1, wherein said monomers include about 5–30 parts by weight of the total monomer solids of a cohesion inducing short chain monomer copolymerizable with the other monomers.

3. A pressure-sensitive adhesive sheet according to claim 2, wherein said cohesion inducing short chain monomer is selected from the group consisting of vinyl acetate, methyl acrylate, and methyl methacrylate.

4. A pressure-sensitive adhesive sheet according to claim 3, wherein said cohesion inducing short chain monomer is vinyl acetate.

5. A pressure-sensitive adhesive sheet according to claim 4, which comprises
   (a) about 2–7 parts of said substituted acrylamide,
   (b) about 1–3 parts of maleic anhydride, and
   (c) about 0.01–0.1 parts of said cross-linking monomer, and wherein said parts are parts by weight of the total monomer solids.

6. A pressure-sensitive adhesive sheet according to claim 1, wherein the unsaturated functional terminal group of said cross-linking monomer is

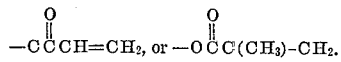

7. A pressure-sensitive adhesive sheet according to claim 1, wherein said acrylamide is diacetone acrylamide.

8. A pressure-sensitive adhesive sheet according to claim 1, wherein said acrylamide is N-tertiary-butylacrylamide.

9. A pressure-sensitive adhesive sheet according to claim 6, wherein said cross-linking monomer comprises alkoxy silyl alkyl groups according to the following general formula:

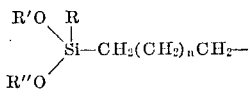

where R' and R" are either CH$_3$— or CH$_3$CH$_2$—, and R is one of the group consisting of CH$_3$—, CH$_3$CH$_2$—, CH$_3$O— and CH$_3$CH$_2$O—, and $n$ is a number of 0 through 8.

10. A pressure-sensitive adhesive sheet according to claim 9, wherein said cross-linking monomer is

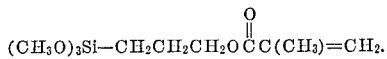

11. A pressure-sensitive adhesive sheet according to claim 9, wherein said catalyst is an organo-metallic salt.

12. A pressure-sensitive adhesive sheet according to claim 11, wherein said catalyst is dibutyltin di-2-ethylhexoate.

13. A pressure-sensitive adhesive composition which comprises a copolymer of monomers comprising
  (a) a major amount of an alkyl acrylate monomer constituent wherein the alcohol moiety comprises an average of no more than about 12 carbon atoms,
  (b) about 2–20 parts by weight of the total monomer solids of a substituted acrylamide according to the following general formula:

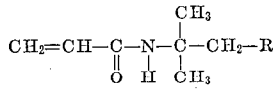

where R is either H or

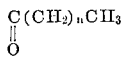

wherein $n$ is a number of 0 through 10
  (c) about 0.5–5.0 parts by weight of the total monomer solids of maleic anhydride, and
  (d) about 0.0005–0.4 parts by weight of the total monomer solids of a cross-linking monomer having an unsaturated functional terminal group which is copolymerizable with the other monomers.

14. A pressure-sensitive adhesive composition according to claim 13, wherein said monomers include about 5–30 parts by weight of the total monomer solids of a cohesion inducing short chain monomer copolymerizable with the other monomers.

15. A pressure-sensitive adhesive composition according to claim 14, wherein said cohesion inducing short chain monomer is selected from the group consisting of vinyl acetate, methyl acrylate, and methyl methacrylate.

16. A pressure-sensitive adhesive composition according to claim 15, wherein said cohesion inducing short chain monomer is vinyl acetate.

17. A pressure-sensitive adhesive composition according to claim 13, wherein the unsaturated functional terminal group of said cross-linking monomer is

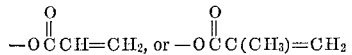

18. A pressure-sensitive adhesive composition according to claim 17, wherein said cross-linking monomer comprises alkoxysilyl alkyl groups according to the following general formula:

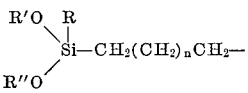

where R' and R" are either CH$_3$—, CH$_3$CH$_2$, CH$_3$O— and CH$_3$CH$_2$O—, and $n$ is a number of 0 through 8.

19. A pressure-sensitive adhesive composition according to claim 18, which comprises an organo-metallic salt catalyst for cross-linking said monomers.

20. A pressure-sensitive adhesive composition according to claim 13, wherein said acrylamide is diacetone acrylamide.

21. A pressure-sensitive adhesive composition according to claim 13, wherein said acrylamide is N-tertiary-butylacrylamide.

References Cited

UNITED STATES PATENTS

| | | | |
|---|---|---|---|
| 3,258,443 | 6/1966 | Cantor et al. | 260—29.6 |
| 3,299,010 | 1/1967 | Samour | 260—78 |
| 3,325,459 | 6/1967 | Gander | 260—80.73 |
| 3,464,849 | 9/1969 | Ehrig et al. | 117—132 |

JOSEPH L. SCHAFER, Primary Examiner

J. NIGHT III, Assistant Examiner

U.S. Cl. X.R.

260—80.73, 80.8, 80.81; 161—216, 217; 117—122, 132, 145, 161

UNITED STATES PATENT OFFICE
CERTIFICATE OF CORRECTION

Patent No. 3,558,574      Dated January 26, 1971

Inventor(s) Donald F. Doehnert

It is certified that error appears in the above-identified patent and that said Letters Patent are hereby corrected as shown below:

The Title should read --Acrylate--not "Acrylated". In the Abstract, line 18, "anhydride" is misspelled. In line 19, after "monomer" insert --such as an alkoxy silyl cross-linking monomer.-- In Column line 46, insert --adhesive-- after "sensitive" and correct the spellin of "excellent". In Column 2, line 26, after "copolymer" insert --, preferably in the amount of about 50-85 parts by weight of the copolyme In Column 2, the last formula, that portion reading "$(CH_3)=CH$" should $(CH_3)=CH_2$--. In Column 3, line 10 should read --$CH_3O$- and $CH_3CH_2O$- - Same Column, line 11, "cross-linking" is misspelled, Same Column, line 72, "blocking" should read --backing--. In Column 4, line 44, insert --layer-- after "adhesive". Same Column, line 52, "indicated" is misspelled. Under Example IV, "65" should read --75--. In Column an asterisk should be added to the Table -- * "A" means acetone and "EA" means ethyl acrylate.-- In Column 5, line 59, "clossy" should re --glossy--. In Claim 1, the second "(a)" should read --(d)--. In Claim 18, lines 22-23 should read: --where R' and R" are either $CH_3$-, or $CH_3CH_2$-, and R is one of the group consisting of $CH_3$-,$CH_3CH_2$, $CH_3O$- and $CH_3CH_2O$-, and n is a number of 0 through 8.--

Signed and sealed this 1st day of June 1971.

(SEAL)
Attest:

EDWARD M. FLETCHER, JR.      WILLIAM E. SCHUYLER, JR.
Attesting Officer      Commissioner of Patents